J. B. MacDONALD.
LUBRICATING DEVICE.
APPLICATION FILED JAN. 25, 1918.

1,327,565.

Patented Jan. 6, 1920.

Inventor
Jack B. McDonald
By Harry C. Schroeder
Attorney

UNITED STATES PATENT OFFICE.

JACK B. MacDONALD, OF OAKLAND, CALIFORNIA.

LUBRICATING DEVICE.

1,327,565.  Specification of Letters Patent.  Patented Jan. 6, 1920.

Application filed January 25, 1918. Serial No. 213,734.

*To all whom it may concern:*

Be it known that I, JACK B. MACDONALD, a citizen of the United States, residing at Oakland, in the county of Alameda and State of California, have invented certain new and useful Improvements in Lubricating Devices, of which the following is a specification.

This invention is a forced lubricating device, particularly adapted for oiling the cylinder and piston of an engine or pump. The invention, however, may be used for other purposes.

In this specification and the annexed drawing, I illustrate my invention in the form which I consider the best, but I do not limit my invention to such form because it may be embodied in other forms and it is to be understood that in and by the claims following the description herein, I intend to cover my invention in whatever form it may be embodied.

Referring to the drawing.

Figure 1:
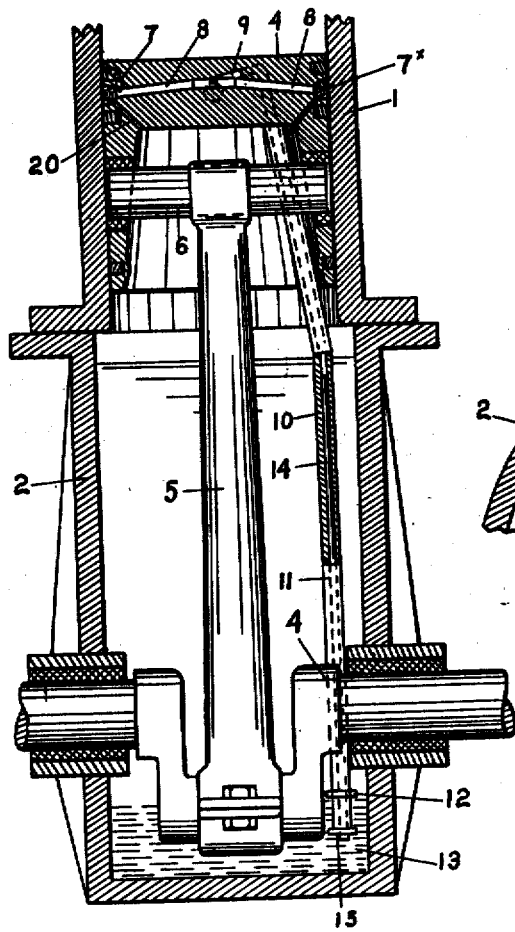
Figure 1 is a vertical longitudinal section through a portion of an engine embodying my invention.
Figure 2:
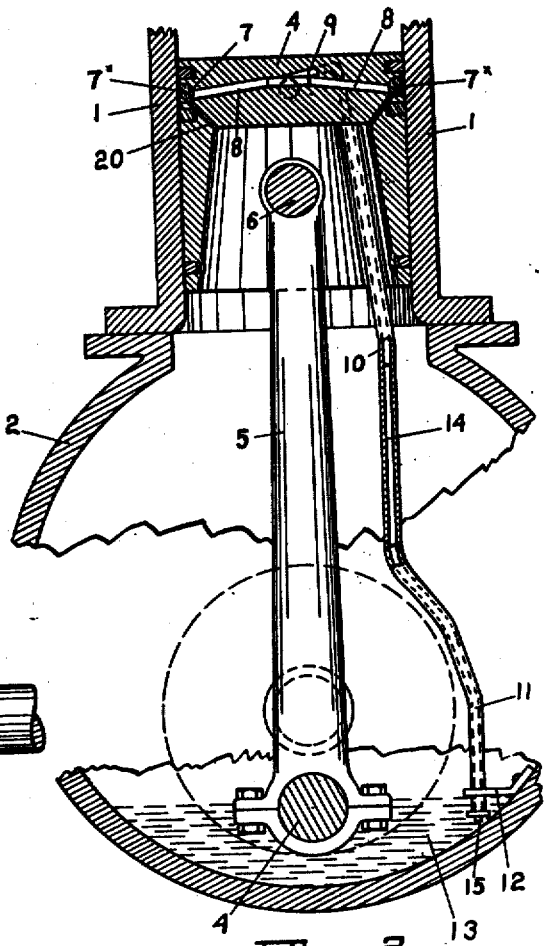
Fig. 2 is a similar view taken at right angles to Fig. 1.

In the drawing, 1 indicates the cylinder of a gas engine, 2 the crank case, 3 the piston, 4 the crank shaft, 5 the connecting rod and 6 the wrist pin, connecting the rod to the piston. An annular groove 7 is provided in the surface of the piston 4, in which groove is placed a ring $7^x$ of absorbent material, such as rope or felt. Conduits 8 are provided in the piston which lead to the groove 7 at various points and with which a conduit 9, also provided in the piston, communicates with the conduit 9 leading from a tube 10 secured to the piston. A tube 11 is secured by bracket 12 to the lower part of the crank case 1 and within the crank case so that its lowermost end rests within the oil sump 13 of the crank case. A tube 14 is secured within the tube and projects beyond the upper end of said tube into the tube 10, slidably fitting within the latter tube. The tubes 10, 11 and 14 are so arranged that the tube 14 always extends into the tube 10 no matter what the position of the piston and the ends of the tubes 10 and 11 meet when the piston reaches the limit of its downward stroke. A check valve 15 is fitted in the lower end of the tube 11 to control the admission of oil into the tube 14. The valve 15 may be of any suitable construction such for illustration as that shown in Fig. 3.

Figure 3:
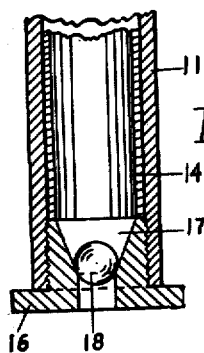
Fig. 3 is a sectional view of the check valve controlling the pumping action of the device.

The valve shown in Fig. 3 comprises a plug 16, screwed into the lower end of the tube 11 and provided with an inverted conical conduit 17 extending therethrough and communicating with the end of tube 14, and a ball 18 movable in said conical conduit and adapted to engage its small end and close it. Conduits 20 lead from the hollow part of the piston.

As the piston and tube 10 rise a vacuum is created in said tube and the valve 15 opens and oil is forced under atmospheric pressure up through tube 14 into tube 10, filling the vacuum therein; and as the piston and tube descend the valve 15 closes and the oil in the tube 10 is forced through conduits 9 and 8 into groove 7 and the absorbent $7^x$ from which it oozes in between the piston and cylinder, lubricating and cooling the same.

The advantage of my lubricator over others and particularly the splash system is that it positively forces the oil in between the piston and cylinder. Any excess of oil forced into the ring $7^x$ passes through the conduits 20 back into the sump; some of the oil passing into the bearings of the wrist pin 6 and oiling the same.

Having described my invention, I claim:

1. In combination with a piston and cylinder and oil sump, said piston being provided with an annular groove, a tube connected to said piston for movement therewith and communicating with said groove, a second tube telescoping within said first tube and secured in position to extend into said sump, a check valve in said tube to prevent the escape of oil into the sump on the expansion stroke of the piston.

2. In combination with a piston and cylinder and oil sump, said piston being provided with an annular groove, a tube connected to the piston and communicating with said groove, a second tube carried by the piston and arranged to telescope within said first tube and communicating with said sump, a check valve in said second tube to prevent escape of oil into the sump on the expansion stroke of the piston, and a ring of absorbent material in said piston groove.

3. In combination with a piston and cylinder and oil sump, said piston being provided with an annular groove, a tube moving with the piston and communicating with said groove, a second tube connected to the piston and telescoping within said first tube and secured in position to communicate with said sump, a check valve in said second tube to prevent escape of oil into the sump on the expansion stroke of the piston, a ring of absorbent material in said piston groove, and said piston being provided with conduits leading from said piston grooves to return the excess oil to the sump.

4. In combination with a piston and cylinder and oil sump, said piston being provided with an annular groove, a passage communicating with said groove, a tube connected to the piston and telescoping within said passage and positioned to communicate with said sump, a check valve in said tube to prevent escape of oil into the sump on the expansion stroke of the piston, a ring of absorbent material in said piston groove, said piston being provided with conduits leading from said piston grooves to return the excess oil to the sump, one of said conduits leading to a point over the wrist pin of the piston.

In testimony whereof I affix my signature.

JACK B. MacDONALD.